(12) United States Patent
Gao et al.

(10) Patent No.: US 10,458,830 B2
(45) Date of Patent: Oct. 29, 2019

(54) METHOD FOR IMPROVING FUEL ECONOMY TEST PRECISION IN ON-ROAD VEHICLES

(71) Applicant: ExxonMobil Research and Engineering Company, Annandale, NJ (US)

(72) Inventors: Zhisheng Gao, Rose Valley, PA (US); Steven M. Jetter, Highstown, NJ (US); Riccardo Conti, Medford, NJ (US); Arthur T. Andrews, Philadelphia, PA (US); Aparna Subramanian, Media, PA (US); Leonard R. Koenig, Jobstown, NJ (US); Steven Kennedy, West Chester, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 206 days.

(21) Appl. No.: 15/667,135

(22) Filed: Aug. 2, 2017

(65) Prior Publication Data
US 2018/0052025 A1 Feb. 22, 2018

Related U.S. Application Data

(60) Provisional application No. 62/377,025, filed on Aug. 19, 2016.

(51) Int. Cl.
*G01M 15/05* (2006.01)
*G01F 9/02* (2006.01)
*G07C 5/00* (2006.01)

(52) U.S. Cl.
CPC ............... *G01F 9/02* (2013.01); *G01M 15/05* (2013.01); *G07C 5/008* (2013.01); *G07C 2205/02* (2013.01)

(58) Field of Classification Search
CPC .................................................... G01M 15/05
(Continued)

(56) References Cited

U.S. PATENT DOCUMENTS 6,594,579 B1 7/2003 Lowrey et al.
7,392,129 B2 6/2008 Hill et al.
(Continued)

FOREIGN PATENT DOCUMENTS

EP 2624183 A1 8/2013
WO 2012/078712 A2 6/2012
(Continued)

OTHER PUBLICATIONS

The International Search Report and Written Opinion of PCT/US2017/045101 dated Nov. 9, 2017.
(Continued)

*Primary Examiner* — Eric S. McCall
(74) *Attorney, Agent, or Firm* — Robert A. Migliorini

(57) ABSTRACT

A method for improving fuel efficiency testing precision in on-road vehicles. The method comprises: installing one or more dataloggers in one or more vehicles, each datalogger configured to receive fuel consumption data broadcast by an on-road vehicle's engine control unit (ECU); transmitting the fuel consumption data from the one or more dataloggers in the one or more on-road vehicles to a processor; and analyzing, using the processor, the fuel consumption data from the one or more dataloggers in the one or more on-road vehicles to determine fuel efficiency of the one or more on-road vehicles. The fuel consumption data comprises fuel rate data from the ECU which is transmitted through the one or more dataloggers, engine speed and other operating parameters from the ECU that are transmitted through the
(Continued)

one or more dataloggers, torque sensor data which is transmitted through the one or more dataloggers, and traditional fuel log data.

26 Claims, 12 Drawing Sheets

(58) Field of Classification Search
USPC .............................. 73/114.52, 114.53, 114.54
See application file for complete search history.

(56) References Cited

U.S. PATENT DOCUMENTS

| | | |
|---|---|---|
| 7,844,404 B2 | 11/2010 | Ling et al. |
| 8,155,867 B2 | 4/2012 | Krause |
| 8,543,287 B2 | 9/2013 | Stevens et al. |
| 8,554,513 B2 | 10/2013 | Kersey et al. |
| 8,924,124 B2 | 12/2014 | Lockwood et al. |
| 2012/0001744 A1 | 1/2012 | Giuli |
| 2012/0109579 A1 | 5/2012 | Kersey et al. |
| 2014/0343786 A1* | 11/2014 | Dvorak ................ F01M 11/10 701/29.5 |
| 2014/0365144 A1* | 12/2014 | Dvorak .............. G01N 33/2888 702/50 |

FOREIGN PATENT DOCUMENTS

| | | |
|---|---|---|
| WO | 2012/118865 A2 | 9/2012 |
| WO | 2013/142508 A2 | 9/2013 |

OTHER PUBLICATIONS

Haggis, Staci F. et al., "In-Use Evaluation of Fuel Economy and Emissions from Coal Haul Trucks Using MOdified SAE J1321 Procedures and PEMS", SAE International Journal of Commercial Vehicles, 2008, vol. 1, issue 1, pp. 210-221.

Pachernegg, S.J., "A Closer Look at the Willans-Line", Society of Automotive Engineers, 1969, International Automotive Engineering Congress, Detroit, Michigan.

"Fuel Consumption Test Procedure—Type II", SAE International Surface Vehicle Recommended Practice J1321, 2012.

Surcel, Marius-Dorin et al., "Fuel Consumption Tests for Evaluating the Accuracy and Precision of Truck Engine Electronic Control Modules to Capture Fuel Data", SAE International, 2009.

* cited by examiner

Fig. 1

| Mode | SPEED | TORQUE | FUEL RATE | POWER | BSFC | Hilly | Flat |
|---|---|---|---|---|---|---|---|
| | RPM | Newton meter (N m) | kg/hr | kW | g/kW hr | wt factor | wt factor |
| 7 | 1200.0 | 588.0 | 17.0 | 73.9 | 230.1 | 0.099 | 0.169 |
| 9 | 1500.0 | 570.0 | 20.3 | 89.5 | 226.2 | 0.154 | 0.271 |
| 11 | 1800.0 | 479.0 | 23.7 | 90.3 | 262.7 | 0.001 | 0.001 |
| 5 | 1200.0 | 1175.0 | 31.1 | 147.7 | 210.7 | 0.100 | 0.152 |
| 3 | 1500.0 | 1140.0 | 36.4 | 179.1 | 203.2 | 0.143 | 0.234 |
| 13 | 1800.0 | 958.0 | 41.8 | 180.6 | 231.6 | 0.003 | 0.003 |
| 6 | 1200.0 | 1762.1 | 46.1 | 221.4 | 208.3 | 0.072 | 0.046 |
| 4 | 1500.0 | 1710.1 | 53.0 | 268.6 | 197.2 | 0.097 | 0.068 |
| 12 | 1800.0 | 1437.0 | 59.1 | 270.9 | 218.2 | 0.001 | 0.001 |
| 2 | 1200.2 | 2460.0 | 59.8 | 309.1 | 193.6 | 0.196 | 0.022 |
| 8 | 1500.0 | 2364.2 | 74.1 | 371.4 | 199.6 | 0.129 | 0.029 |
| 10 | 1800.0 | 1929.2 | 75.8 | 363.7 | 208.5 | 0.003 | 0.002 |
| | | | | | Total | 1.00 | 1.00 |
| | | | | | Average Fuel Rate (kg/h) | 43.3 | 31.2 |
| | | | | | Average Power (kW) | 214.0 | 149.2 |
| | | | | Normalized Average Fuel Rate to the Same Average Power (149.2 kW) | | 30.9 | 31.2 |

Fig. 3

| Fluid | Mode | SPEED | TORQUE | FUEL RATE | POWER | BSFC | Hilly | Flat |
|---|---|---|---|---|---|---|---|---|
| | | RPM | N·m | kg/hr. | kW | g/kW·hr | wt factor | wt factor |
| 07-12877 (15W-40) | 7 | 1200.0 | 588.0 | 17.0 | 73.9 | 229.7 | ... | 0.169 |
| 07-12877 (15W-40) | 9 | 1500.0 | 570.0 | 20.3 | 89.5 | 227.1 | ... | 0.271 |
| 07-12877 (15W-40) | 11 | 1800.0 | 479.0 | 23.6 | 90.3 | 263.4 | ... | 0.001 |
| 07-12877 (15W-40) | 5 | 1200.0 | 1175.1 | 31.1 | 147.7 | 210.9 | ... | 0.152 |
| 07-12877 (15W-40) | 3 | 1500.0 | 1140.0 | 36.5 | 179.1 | 203.9 | ... | 0.234 |
| 07-12877 (15W-40) | 13 | 1800.0 | 958.0 | 42.1 | 180.6 | 232.9 | ... | 0.003 |
| 07-12877 (15W-40) | 6 | 1200.0 | 1762.0 | 46.1 | 221.4 | 208.3 | ... | 0.048 |
| 07-12877 (15W-40) | 4 | 1500.0 | 1710.0 | 53.3 | 268.6 | 198.3 | ... | 0.068 |
| 07-12877 (15W-40) | 12 | 1800.0 | 1437.0 | 59.4 | 270.9 | 219.1 | ... | 0.001 |
| 07-12877 (15W-40) | 2 | 1200.2 | 2472.2 | 60.4 | 310.7 | 194.3 | ... | 0.022 |
| 07-12877 (15W-40) | 8 | 1500.0 | 2389.2 | 75.0 | 375.3 | 199.8 | ... | 0.029 |
| 07-12877 (15W-40) | 10 | 1800.0 | 1923.7 | 75.5 | 362.6 | 208.3 | ... | 0.002 |
| Total | | | | | | | 1.00 | 1.00 |
| Average Fuel Rate (kg/hr) | | | | | | | ... | 31.4 |
| Average Power (kW) | | | | | | | ... | 149.3 |
| 08-70266 (5W-30) | 7 | 1200.0 | 588.1 | 16.8 | 73.9 | 227.6 | 0.099 | ... |
| 08-70266 (5W-30) | 9 | 1500.0 | 569.9 | 20.2 | 89.5 | 225.3 | 0.154 | ... |
| 08-70266 (5W-30) | 11 | 1800.0 | 479.0 | 23.5 | 90.3 | 260.6 | 0.001 | ... |
| 08-70266 (5W-30) | 5 | 1200.0 | 1175.0 | 31.0 | 147.7 | 210.0 | 0.100 | ... |
| 08-70266 (5W-30) | 3 | 1500.0 | 1139.9 | 36.3 | 179.1 | 202.8 | 0.143 | ... |
| 08-70266 (5W-30) | 13 | 1800.0 | 967.9 | 41.8 | 180.6 | 231.3 | 0.003 | ... |
| 08-70266 (5W-30) | 6 | 1200.0 | 1762.1 | 46.0 | 221.4 | 207.5 | 0.072 | ... |
| 08-70266 (5W-30) | 4 | 1500.0 | 1710.0 | 53.1 | 268.6 | 197.5 | 0.097 | ... |
| 08-70266 (5W-30) | 12 | 1800.0 | 1437.0 | 59.1 | 270.9 | 218.3 | 0.001 | ... |
| 08-70266 (5W-30) | 2 | 1199.8 | 2467.4 | 60.3 | 310.0 | 194.7 | 0.196 | ... |
| 08-70266 (5W-30) | 8 | 1500.0 | 2396.7 | 75.1 | 376.5 | 199.4 | 0.129 | ... |
| 08-70266 (5W-30) | 10 | 1800.0 | 1928.0 | 75.5 | 363.4 | 207.7 | 0.003 | ... |
| Total | | | | | | | 1.00 | ... |
| Average Fuel Rate (kg/h) | | | | | | | 43.5 | ... |
| Average Power (kW) | | | | | | | 214.8 | ... |
| Average Fuel Rate Normalized to 149.3 kW average Power | | | | | | | 30.9 | |

Fig. 4

| Mode | Fuel Rate (l/hr) | | |
|---|---|---|---|
| | ECU* | MicroMotion Flow Meter | % Difference |
| 1 | 1 | 1.8 | -44.4 |
| 7 | 18 | 20.5 | -12.2 |
| 9 | 22 | 24.4 | -9.8 |
| 11 | 28 | 28.4 | -1.4 |
| 5 | 37 | 37.7 | -1.9 |
| 3 | 42.5 | 43.7 | -2.7 |
| 13 | 51.8 | 50.5 | 2.6 |
| 6 | 54.9 | 56 | -2.0 |
| 4 | 61.7 | 63.6 | -3.0 |
| 12 | 72.1 | 71 | 1.5 |
| 2 | 72.1 | 74.2 | -2.8 |
| 8 | 87.6 | 89.3 | -1.9 |
| 10 | 93 | 89.4 | 4.0 |

*Resolution of ECU is +/- 1 liter/hr (data reported were average of ~60 seconds)

Fig. 6

|  |  | MILES TRAVELED | FUEL ADDED, gal | MPG |
|---|---|---|---|---|
| Phase 1 | CTRL (5W-30) | 50405 | 8563 | 5.89 |
|  | TEST (5W-30) | 37166 | 6320 | 5.88 |
| Phase 2 | CTRL (5W-30) | 68737 | 11827 | 5.81 |
|  | TEST (15W-40) | 71568 | 12379 | 5.78 |

|  | MILES TRAVELED | FUEL ADDED, gal | MPG | % FE 5W-30 vs. 15W-40 |
|---|---|---|---|---|
| All Vehicles on 15W-40 | 71568 | 12379 | 5.78 | 1.2 |
| All Vehicles on 5W-30 | 156308 | 26710 | 5.85 |  |

Fig. 7

| | TRUCKS | OP TIME (Hr) | FUEL USED (liters) | FUEL RATE (Liters/Hr) |
|---|---|---|---|---|
| Phase 1 | CTRL (5W-30) | 529 | 19667 | 37.2 |
| Phase 1 | TEST (5W-30) | 610 | 22388 | 36.7 |
| Phase 2 | CTRL (5W-30) | 750 | 28178 | 37.5 |
| Phase 2 | TEST (15W-40) | 561 | 21097 | 37.6 |

| Oils | OP TIME (Hr) | FUEL USED (liters) | FUEL RATE (Liters/Hr) | % FE (5W-30 vs 15W-40) |
|---|---|---|---|---|
| 15W-40 | 561 | 21097 | 37.6 | 1.23 |
| 5W-30 | 1890 | 70233 | 37.2 | |

Fig. 8

| | TRUCKS | OP TIME (Hr) | FUEL USED (Liters) | FUEL RATE (Liters/Hr) | |
|---|---|---|---|---|---|
| Phase 1 | CTRL (5W-30) | 288 | 727 | 2.52 | |
| Phase 1 | TEST (5W-30) | 260 | 719 | 2.77 | Low fuel rates! Higher error potentially |
| Phase 2 | CTRL (5W-30) | 438 | 1119 | 2.56 | |
| Phase 2 | TEST (15W-40) | 320 | 951 | 2.97 | |

| Oils | OP TIME (Hr) | FUEL USED (Liters) | FUEL RATE (Liters/Hr) | % FE (5W-30 VS 15W-40) |
|---|---|---|---|---|
| 15W-40 | 320 | 951 | 2.97 | 12.3 |
| 5W-30 | 986 | 2564 | 2.60 | |

Fig. 9

| FUEL RATE ANALYSIS SUMMARY ||
|---|---|
| TOTAL TIME SPENT (Hours) | TOTAL FUEL USED (Liters) |
| 3486 | 95778 |

| ENGINE STATE | % TIME | % FUEL | 5W-30 BENEFITS |
|---|---|---|---|
| IDLE | 28.27 % | 2.68 % | 12.31 % |
| NORMAL | 71.73 % | 97.32 % | 1.23 % |

| TOTAL BENEFITS FOR 5W-30 (BY FUEL) |
|---|
| 1.5 % |

METHOD FOR IMPROVING FUEL ECONOMY TEST PRECISION IN ON-ROAD VEHICLES

CROSS-REFERENCE TO RELATED APPLICATIONS

This application claims priority to U.S. Provisional Application Ser. No. 62/377,025 filed Aug. 19, 2016, which is herein incorporated by reference in its entirety.

FIELD

This disclosure relates to a method for improving fuel efficiency testing precision in on-road vehicles.

BACKGROUND

In real world on-road transportation, there are many factors that can affect the overall vehicle fuel economy testing, even if the vehicle design and fuel/lubricants used remain the same. Such factors for heavy duty trucks include, for example, drivers with different operating styles (up to 35% variation in fuel economy), driving speeds (increasing speed from 55 to 75 mph can increase fuel consumption by 50%), payloads (reducing payload by 10,000 pounds increases fuel savings by 4.4%), tires (underinflated tire can reduce fuel efficiency by 3-5%), and the like.

In order to improve fuel economy, techniques are needed to measure fuel economy in vehicles under real operating conditions. There are existing industry test procedures (e.g., SAE J1321 and J1376) for measuring relative fuel economy of on-road vehicles (also known as two-truck tests). These procedures are intended to be used under controlled, warmed-up conditions on a test tract or on suitable roads. Many variables are controlled in the tests, including drivers, elapsed time, cargo weights etc. Due to the controlled environment required, it is very difficult to conduct this type of testing in real world applications.

The development of new and improved energy efficiency tests has been an on-going research effort. What is needed is an improved energy efficiency test for measuring fuel efficiency of on-road vehicles, in particular, a test for improving fuel economy testing precision of on-road vehicles.

SUMMARY

This disclosure relates in part to a method for improving fuel efficiency testing precision in on-road vehicles. The method comprises: installing one or more dataloggers in one or more vehicles, each datalogger configured to receive fuel consumption data broadcast by an on-road vehicle's engine control unit (ECU); transmitting the fuel consumption data from the one or more dataloggers in the one or more on-road vehicles to a processor; and analyzing, using the processor, the fuel consumption data from the one or more dataloggers in the one or more on-road vehicles to determine fuel efficiency of the one or more on-road vehicles.

This disclosure also relates in part to a method for improving fuel efficiency testing precision in on-road vehicles. The method comprises: installing one or more dataloggers in one or more vehicles, each datalogger configured to receive fuel consumption data broadcast by an on-road vehicle's engine control unit (ECU); if not already in place, installing one or more torque sensors in the one or more vehicles, each torque sensor configured to measure torque value in the one or more on-road vehicles; transmitting the fuel consumption data from the one or more dataloggers and the one or more torque sensors in the one or more on-road vehicles to a processor; and analyzing, using the processor, the fuel consumption data from the one or more dataloggers and the one or more torque sensors in the one or more on-road vehicles to determine fuel efficiency of the one or more on-road vehicles.

This disclosure further relates to a method for determining oil drain interval in on-road vehicles. The method comprises: installing one or more dataloggers in one or more vehicles, each datalogger configured to receive fuel consumption data broadcast by an on-road vehicle's engine control unit (ECU); if not already in place, installing one or more torque sensors in the one or more vehicles, each torque sensor configured to measure torque value in the one or more on-road vehicles; transmitting the fuel consumption data from the one or more dataloggers and optionally the one or more torque sensors in the one or more on-road vehicles to a processor; and analyzing, using the processor, the fuel consumption data from the one or more dataloggers and optionally the one or more torque sensors in the one or more on-road vehicles to determine fuel efficiency of the one or more on-road vehicles. The oil drain interval is determined by the relationship between fuel efficiency and oil age.

It has been surprisingly found that, in accordance with this disclosure, improvements in fuel efficiency testing precision in on-road vehicles are obtained by collecting and analyzing fuel consumption data including fuel rate data from the ECU which is transmitted through the one or more dataloggers, engine speed and other operating parameters from the ECU that are transmitted through the one or more dataloggers, torque sensor data which is transmitted through the one or more dataloggers, and traditional fuel log data. In accordance with this disclosure, a precise comparison of average fuel consumption data can be made for different lubricants.

Other objects and advantages of the present disclosure will become apparent from the detailed description that follows.

BRIEF DESCRIPTION OF THE DRAWINGS

FIG. 1 shows Volvo-Mack MP8 reference test results (Delvac 1 ESP 5 W-40, 09-06217) in accordance with Example 1.

FIG. 3 shows Volvo-Mack MP8 reference test results for 15 W-40 and 5 W-30 engine oils in accordance with Example 3.

FIG. 4 shows a comparison between Engine Control Unit (ECU) and measured data in MP8 stationary engine test in accordance with Example 4.

FIG. 6 shows field trial data based on traditional fuel log in accordance with Example 5.

FIG. 7 shows, under normal driving conditions, the data in each of the phases for comparison between the 5 W-30 and the 15 W-40 engine oils, and comparison of the combined Phase 1 and Phase 2 results for 5 W-30 and 15 W-40 engine oils in accordance with Example 5.

FIG. 8 shows, under idle conditions, the data in each of the phases for comparison between the 5 W-30 and the 15W40 engine oils, and comparison of the combined Phase 1 and Phase 2 results for 5 W-30 and 15 W-40 engine oils in accordance with Example 5.

FIG. 9 shows data for both normal driving and idle conditions combined to allow the assessment of the overall benefits of 5 W-30 vs. 15 W-40 in accordance with Example 5.

DETAILED DESCRIPTION

Figure 2:
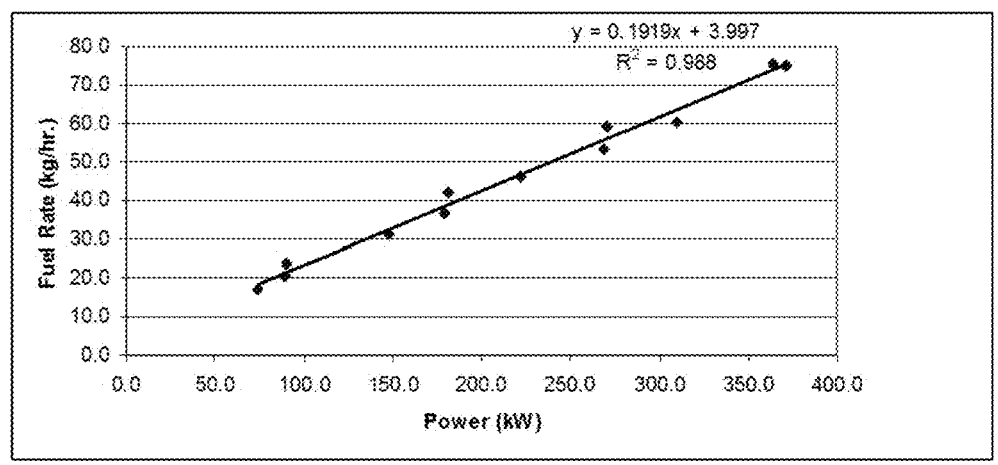
FIG. 2 shows the dependence of fuel rate on power produced for reference Oil 09-06210 in accordance with Example 2.

All numerical values within the detailed description and the claims herein are modified by "about" or "approximately" the indicated value, and take into account experimental error and variations that would be expected by a person having ordinary skill in the art.

As used herein, the one or more dataloggers refer to electronic devices that record data over time or in relation to location either with a built in instrument or sensor or via external instruments and sensors. The one or more dataloggers can be based on a digital processor (or computer). The one or more dataloggers can be equipped with a microprocessor, internal memory for data storage, and sensors. The one or more dataloggers can interface with a computer, and use software to activate the datalogger and view and analyze the collected data. The one or more dataloggers can have a local interface device (keypad, LCD) and can be used as a stand-alone device.

As used herein, the one or more databases configured to store the fuel consumption data from the one or more dataloggers can be the same or different databases.

In accordance with this disclosure, a method is provided for improving fuel efficiency testing precision in on-road vehicles. The method includes: installing one or more dataloggers in one or more vehicles, each datalogger configured to receive fuel consumption data broadcast by an on-road vehicle's engine control unit (ECU); transmitting the fuel consumption data from the one or more dataloggers in the one or more on-road vehicles to a processor; and analyzing, using the processor, the fuel consumption data from the one or more dataloggers in the one or more on-road vehicles to determine fuel efficiency of the one or more on-road vehicles.

The fuel efficiency testing compares one or more of the following: lubricants of different viscometric properties; mineral versus synthetic lubricants including engine oils, gear oils, and hydraulic fluids; combinations of lubricants and hardware designs; lubricants with and without friction modifiers; lubricants with different frictional properties; fresh lubricants and aged lubricants; and combinations of lubricants and fuels. The different lubricants are lubricants with different viscosity grades, low and high shear viscosities at different temperatures, or with different additives or different concentrations of additives.

The fuel consumption data includes, for example, fuel rate data from the ECU which is transmitted through the one or more dataloggers, engine speed and other operating parameters from the ECU that are transmitted through the one or more dataloggers, torque sensor data which is transmitted through the one or more dataloggers, traditional fuel log data, and the like.

In most of the vehicles today, the torque from the ECU is not a direct measurement from a sensor on the vehicle but rather a calculated value expressed as a percent of engine reference torque. Torque is relative to the torque curve for the engine as a function of air intake quantity, engine speed, boost, altitude, temperatures and other engine characteristics. The Actual & Demand Engine Torque Percent parameters are reported using SAE J1939 protocol in-vehicle network datalogger. This datalogger utilizes controller area network (CAN) bus to interface to vehicle operation data transmitted from the ECU. J1939 standard defines numerous parameters that could be on a vehicle and user selectable for acquisition. Several different parameters are recorded for proof of performance testing. Torque could also be derived by direct measurement utilizing a sensor mounted on the transmission shaft and by indirect measurements, such as from combustion pressure sensing elements in the engine combustion chamber and from speed measurement of rotating engine components (e.g., crankshaft). In this disclosure, the actual measured torque value, if available, is used in the calculation of the engine power and BSFC, like in the dyno examples. External torque sensors, such as Surface Accoustic Wave (SAW) sensors from Honeywell, could also be installed for toque measurements for vehicles not equipped with torque sensors.

In an embodiment, the fuel consumption data describes at least one of a plurality of on-road vehicle parameters including, for example, vehicle speed, fuel level, engine speed, load, mass air flow, manifold air pressure, odometer reading, and the like.

In the method of this disclosure, the analyzing includes, for example, determining an amount of fuel consumed by the one or more on-road vehicles during an interval, determining a distance traveled by the one or more on-road vehicles during the interval, and calculating the one or more on-road vehicle's fuel efficiency from the amount of fuel consumed and the distance traveled during the interval.

The analyzing can also include, for example, determining an amount of fuel consumed under normal driving conditions and idle conditions, and calculating the one or more on-road vehicle's fuel efficiency from the amount of fuel consumed under the normal driving conditions and the idle conditions.

The analyzing can further include, for example, determining one or more of driving speed, engine revolutions per minute (rpm), and engine operating conditions under normal driving conditions and idle conditions, and calculating the one or more on-road vehicle's fuel efficiency from one or more of driving speed, engine revolutions per minute (rpm), and engine operating conditions under normal driving conditions and idle conditions.

Algorithms can be employed to determine formulaic descriptions of the integration of the data source information using any of a variety of known mathematical techniques. These formulas, in turn, can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described above.

In particular, these formulas can be used for calculating fuel efficiency of one or more on-road vehicles based on fuel consumption data transmitted from one or more dataloggers in the one or more on-road vehicles, as described herein. The calculated fuel efficiencies can be used for comparing lubricants of different viscometric properties, including lubricants with different viscosity grades, low and high shear viscosities at different temperatures, or with different additives; mineral versus synthetic lubricants including engine oils, gear oils, and hydraulic fluids; combinations of lubricants and hardware designs; lubricants with and without friction modifiers; lubricants with different frictional properties fresh lubricants and aged lubricants; and combinations of lubricants and fuels.

In an embodiment, the method of this disclosure involves correlating fuel rate and power produced sufficient to form a basis for normalization of different fuel rates to the same average power. The normalization can be calculated by the formula $$FR2=FR1+k(P2-P1)$$

wherein FR2 is the normalized fuel rate, FR1 is the original fuel rate, k is the slope of a fuel rate versus power plot, P2 is the average power to be normalized to, and P1 is the original power.

The method of this disclosure can include collecting, in one or more databases, the transmitted fuel consumption data from the one or more dataloggers in the one or more on-road vehicles.

In an embodiment, the one or more databases store, review and filter data and information for comparing lubricants of different viscometric properties; mineral versus synthetic lubricants; combinations of lubricants and hardware designs; lubricants with and without friction modifiers; lubricants with different frictional properties; fresh lubricants and aged lubricants; combinations of lubricants and fuels; and the like.

The one or more databases allow for selective mining and statistical treatment of: operating regimes across vehicles; near continuous operational data on specific vehicles or classes of vehicles; identification of vehicles or time periods where measured operation is outside of typical domains; selective filtering of data based on operational data parameters; and associating vehicle engines with keys linked to external oil analysis.

The one or more databases used by a network are for reporting and data analysis. According to one embodiment, the one or more databases are a central repository of data that is created by storing certain fuel consumption data. According to another embodiment, the one or more databases store, review, and filter, for example, fuel rate data from the ECU which is transmitted through the one or more dataloggers, engine speed and other operating parameters from the ECU that are transmitted through the one or more dataloggers, torque sensor data which is transmitted through the one or more dataloggers, traditional fuel log data, and the like.

According to another embodiment, the one or more databases store, review and filter, for example, a plurality of on-road vehicle parameters including, for example, vehicle speed, fuel level, engine speed, load, mass air flow, manifold air pressure, odometer reading, and the like.

In another embodiment, the one or more databases store, review and filter data and information for correlating between fuel rate and power produced. This correlation is the basis of different fuel rates to the same average power.

In yet another embodiment, the one or more databases store, review and filter data and information from stationary engine testing, on-road engine testing, and the like.

In still another embodiment, the one or more databases store, review and filter data and information for comparing lubricants of different viscometric properties, including viscosity grades and low and high shear viscosities at different temperatures; mineral versus synthetic lubricants including engine oils, gear oils, and hydraulic fluids; combinations of lubricants and hardware designs; lubricants with and without friction modifiers; lubricants with different frictional properties fresh lubricants and aged lubricants; combinations of lubricants and fuels; and the like.

In another embodiment, the one or more databases store, review and filter data and information for correlating fuel consumption with lubricant age. If there is an increase in fuel consumption when the lubricant is aged, oil drain interval is selected before substantial increase in fuel consumption. This correlation is further used to control the oil change indicator on the dashboard of the vehicle.

In yet another embodiment, the one or more databases allow the aggregation of logged vehicle data and association with new and used lubricant analytical results. The one or more databases efficiently manage the entirety of logged vehicle data by reading datalogger files and appending those data records to the database, and applying normalizing transformations as needed. The interpretation of controller area network (CAN) messages from external sensors not specified by SAE J1939 can be applied as part of the loading process.

The merged collection of logged data allows selective mining and statistical treatment of: operating regimes across vehicles; near continuous operational data on specific vehicles or classes of vehicles; identification of vehicles or time periods where measured operation is outside of typical domains; selective filtering of data based on operational data parameters (e.g., fuel rate and rpm where intake air temperature was >120° F.); and associating vehicle engines with keys linked to external oil analysis allowing environmental and operating conditions between oil sampling to be incorporated in the analysis of data using sampling time as the tie point to logged vehicle data.

A machine learning process such as artificial neural networks (ANNs) is used to link fuel economy to critical parameters including those from the engine control unit (ECU) and global positioning system (GPS), such as vehicle aerodynamics, lubricant temperature, intake air temperature, driving style, route (longitude, latitude, and altitude), load, traffic, and weather condition. An optimized lubricant combination can be selected automatically based on the historical and planned future driving conditions.

The one or more databases can use staging, data integration, and access layers to house its key functions. The staging layer or staging database stores raw data extracted from each of the disparate source data systems (e.g., one or more dataloggers and one or more torque sensors). The integration layer integrates the disparate data sets by transforming the data from the staging layer often storing this transformed data in an operation data store database. Also, the reporting, storing, reviewing, and/or filtering of information, for the various purposes described above, can occur in the one or more databases. The integrated data can then be moved to yet another database, where the data is arranged into hierarchical groups often called dimensions and into facts and aggregate facts. The access layer helps users retrieve data.

The one or more databases can be focused on a specific area of interest. For example, the one or more databases can be focused on one or more of reporting and data analysis, including the storing, reviewing, and/or filtering of information, for any of the various purposes described above. The one or more databases can be subdivided for improved performance and ease of use within that area.

In accordance with this disclosure, the processor is configured to algorithmically calculate the fuel efficiency of the one or more on-road vehicles based on fuel consumption data transmitted from the one or more dataloggers in the one or more on-road vehicles.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, R, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

The method of this disclosure can include the use of wireless Internet and 3G/4G connections. Data transmission from the in-vehicle datalogger back into a database can be automated using a wireless Wi-Fi option. Wi-Fi infrastructure can use 802.11n Wi-Fi Access Points at 2.4 GHz that provides connection between WiFi enabled datalogger to a wireless area network via backchannel virtual private network. All the messages transmitted across the network can be encrypted and use of firewall provides a secure connection.

In accordance with this disclosure, a method is provided for improving fuel efficiency testing precision in on-road vehicles. The method comprises: installing one or more dataloggers in one or more vehicles, each datalogger configured to receive fuel consumption data broadcast by an on-road vehicle's engine control unit (ECU); installing one or more torque sensors in the one or more vehicles, each torque sensor configured to measure torque value in the one or more on-road vehicles; transmitting the fuel consumption data from the one or more dataloggers and the one or more torque sensors in the one or more on-road vehicles to a processor; and analyzing, using the processor, the fuel consumption data from the one or more dataloggers and the one or more torque sensors in the one or more on-road vehicles to determine fuel efficiency of the one or more on-road vehicles.

The method of this disclosure can include collecting, in one or more databases, the transmitted fuel consumption data from the one or more dataloggers and one or more torque sensors in the one or more on-road vehicles.

In an embodiment, the processor is configured to algorithmically calculate the fuel efficiency of the one or more on-road vehicles based on fuel consumption data transmitted from the one or more dataloggers and the one or more torque sensors in the one or more on-road vehicles.

Thus, systems, methods and computer programs are herein disclosed to enable analysis of fuel consumption data from the one or more dataloggers and the one or more torque sensors. Through the one or more dataloggers and the one or more torque sensors, a way is provided to effectively implement, manage, monitor, and improve fuel efficiency testing precision in on-road vehicles.

In accordance with the method of this disclosure, the fuel efficiency testing compares lubricants. Illustrative lubricants include, for example, road transportation lubricants (oils, greases, etc.) such as Passenger Car Engine Oils (PCEO), Light Duty Diesel Oils (LDDO), Heavy Duty Diesel Oils (HDDO), Automatic Transmission Fluids (ATF), Automotive Gear Oils (AGO), and the like; trans-/inter-continental lubricants such as railroad, marine, aviation (jet oil, piston engine oil, frame lubricants, wheel bearings, etc.); stationary plant lubricants (oils, greases, etc.) such as Gas Engine Oils (GEO), industrial (turbines, compressors, paper machines, wind turbines, etc.); and fuel products such as gasoline, diesel, avgas, jet, bunker, and the like.

The method of this disclosure can incorporate telematics including transmission of real-m time or stored data to a central computer (Wi-Fi, LTE, satellite, etc.), or a computer maintained locally to vehicle or industrial unit, or a processor/control system integrated into engine/equipment. The method of this disclosure can also incorporate analysis/correlation of data and feedback to equipment through central computer, or self-contained on unit (vehicle, engine, drivetrain, industrial equipment), or comparison against reference database or Original Equipment Manufacturer (OEM) design specification (e.g. engine map).

Further, the method of this disclosure can incorporate proprietary algorithms to confirm/predict fuel or lubricant fit for purpose in case of contamination or degradation; fuel or lubricant product integrity including adulteration and misrepresentation; remaining useful lubricant life; potential remediation options including top-up with new lubricant, dose with boutique additive concentrate, and on-board blending; potential equipment failure; potential equipment failure modes; and the like.

The method of this disclosure can provide on-board selection of lubricant and/or fuel for optimum performance including, for example, selection from fully blended fuels/lubes or selected components including additive boosters release from a separate reservoir (e.g. a pouch in an engine oil "cartridge") according to engine operating condition and oil analysis data (e.g. A/O, VM, DI), and for fuels, octane/cetane/volatility/additive on-board/at pump blending to optimize customer experience and engine/vehicle performance (fuel economy/emissions/protection); increased power output/torque/speed; fuel economy; reduced emissions; equipment protection; legislative conformance; and the like.

The data generated in the method of this disclosure can be used for root cause analysis of failure, for example, vehicle/equipment, lubricant and fuel; vehicle/equipment health monitoring; vehicle/equipment maintenance alert including fleet controller and vehicle/equipment operator; vehicle/equipment repair guidance including part replacement/repair and recommendation for future fuel/lubricant selection; driver performance analysis including safety/security/economy recommendations and fleet control manager/dispatcher analysis; route planning/efficiency including commuting and order deliveries; and the like.

In accordance with the method of this disclosure, a wide variety of data can be collected including, for example, engine operation including temperature (oil, coolant, fuel, valves, combustion chamber, and intake air); pressure (intake manifold, oil pump/system, oil filter back pressure, combustion chamber, fuel pump/line/injectors, fuel filter back pressure, cooling system, turbocharger/supercharger, negative pressure in fuel tank, carbon canister loading, SCR urea tank level/injection, exhaust/catalyst back pressure, and tires); speed (engine, vehicle, ignition timing, valve timing, fuel injection timing, turbocharger/supercharger, oil pump, fuel pump, and SCR urea pump); flow rates (engine oil, fuel pump, injectors, coolant circulation, and SCR urea injection); electric signals, output (knock sensor, MAF sensor, pressure sensors, cruise control, throttle position, exhaust gas—$O_2$ sensors, HC, NOx, gear selection, BMEP, cooling fans on/off, rpm, alternator output, electrical load on system (includes fans, A/C, lights, radio, etc.), and 4WD, ABS, anti-skid, power steering pump engagement); abnormal combustion events (knock, pre-ignition, LSPI, hesitation, stumble, and misfiring); other effects that might be due to injector fouling, intake valve fouling, exhaust valve fouling/burning/recession, spark plug fouling, PCV fouling/blockage, ICV fouling, and the like (idle speed, idle quality, catalyst/$O_2$ sensor inefficiencies—emission levels/$O_2$ irregularities, fuel consumption, and engine system fault codes); abnormal operation (oil pressure, level, consumption, dilution, and presence of undesirable chemical species/concentrations in exhaust gas); vehicle characteristics (weight, weight distribution, towed weight, height above road surface and relative attitude (front to back), and suspension position); ancillary unit operating condition including transmission oil—Automated Transmission Fluids (ATF)/manual transmission fluids, temperature, pressure, flow rate, and condition/contamination, remaining life; and industrial oils including viscosity, temperature, pressure (e.g. hydraulic system), flow rate, water content, TAN, color, additive depletion, tank/reservoir level, contamination, ferrography, IR spectra—characteristic peaks (additives, degradation products), particle count/size distribution, vibration/other sensors, and remaining useful life.

The data generated by the method of this disclosure can be used in a variety of ways. For a customer of oil/fuel products, the data can be used for detection/verification of correct oil/fuel quality (DNA or fingerprint) including brand, base oil type—mineral/synthetic/bio-based/other; viscosity, volatility, API/ILSAC/ACEA designation; warning of potential specific problem and potential cure (not just meaningless error code and generic "take to dealership" message); fuel octane/cetane quality, grade; fluid levels—oil, fuel, coolant, SCR urea, washer fluid; vehicle routine maintenance needs; and imminent catastrophic condition. The use of GPS data can tie engine operation into geographic location, terrain, traffic condition/density, weather (temperature, humidity, air quality), and the like; for marine and aviation, can tie into atmospheric conditions (include ambient temperature, humidity, contamination (e.g. dust, pollen, water, industrial spray/emissions), regulated areas (including low emission region near coasts), and the like; and can be a flag to customer about potential road, weather, natural hazards, proximity of company service stations, other facilities in the area, monitor driver (fatigue, safety, refreshment reminder), and the like.

For a producer of oil/fuel products, the data can be used for a variety of purposes including, for example, gathering data during field (fleet) testing (enables more specific analysis of engine/vehicle performance, and greater confidence in correlating benefits due to fuel/lubricant), field engineer/ service station recommendations (customize specific lubricants/fuels to adapt to customer habits and equipment operation (performance or protection: (viscosity grade, boutique fuels, mineral versus synthetic, maximize economy/reduce costs), feedback to driver/pilot/equipment operator, to improve engine/equipment operation, again protecting equipment, reducing fuel/energy usage, potentially enabling OEM's to downsize in future, and optimizing the oil drain interval, filter change), feed back into considerations for future lubricant/fuel formulation and marketing strategy, demonstrate to customers (equivalency (regulation), performance improvement, fuel economy, energy saving, longer life, lower temperature, improved filterability, cleanliness, air release, etc., and wear protection).

The following non-limiting examples are provided to illustrate the disclosure.

EXAMPLES

Example 1

Volvo-Mack MP8 Stationary Engine Test Reference Results

The MP8 fuel economy stationary engine test at PR&T was based on a 425 hp Volvo-Mack MP8 engine. A General Electric Model 5TKF5011AA01AOO1 dynamometer and an Interface Model 1110AO-2K load cell were used in the test. The test was conducted at a cycle of 12 modes (different Speeds and Torques) and the cycle was repeated 5 times, but only the data from last four runs were used (first one as warm-up). Given in FIG. 1 is a single set of reference data. The reference oil is a 5 W-40 (09-06217). In FIG. 1, the average Engine Speed, Torque, Fuel Rate, Power, Brake Specific Fuel Consumption (BSFC) for each mode were reported. Among these parameters, Engine Speed, Torque, and Fuel Rate were measured independently. Power was calculated by multiplying Engine Speed (after converting to rad/s) and Torque. BSFC was also calculated by dividing Fuel Rate (after converting to g/hr.) by Power. Two types of driving conditions, Hilly and Flat, were simulated using different weighting factors. The weighting factors for Hilly and Flat driving conditions are also shown in FIG. 1.

Example 2

Correlation Between Fuel Rate and Power Produced

The relationship between fuel rate and power produced is illustrated in FIG. 2. It is consistent with the Willians line (Pachernegg, S., "A Closer Look at the Willians-Line," SAE Technical Paper 690182, 1969, doi:10.4271/690182). This correlation is the basis for normalization of different Fuel Rates to the same average Power. The data shown in FIG. 2 was obtained under steady-state operating conditions in a laboratory stationary engine test. In field applications, we would expect the data be more scattering due to the transient nature of the operation.

The weighting factors under Hilly and Flat in FIG. 1 were used to compute the average Fuel Rate and Power for Hilly and Flat driving conditions. The average Fuel Rate for Hilly road is 43.3 kg/hr., significantly higher than the average Fuel Rate of 31.2 kg/hr. for the Flat road. This difference is due to the higher average Power required in Hilly road. When the average Fuel Rate for the Hilly road was normalized to the same average Power as the Flat road, the normalized Fuel Rate for the Hilly road was within 1% of the Fuel Rate for the Flat Road. Even though in field testing the variations in road condition are unlikely as extreme as in this case, some variations do exit. In addition, different driving habits would have similar effect as well.

The following equation is used in the calculation of the normalized Fuel Rate:

$$FR2=FR1+k(P2-P1) \qquad \text{Eq. 1}$$

where FR2 and FR1 are the normalized fuel rates and the original fuel rates, respectively, k is the slope from the fuel rate vs. power plot (FIG. 2), and P2 and P1 are the average power to be normalized to and the original power, respectively.

Example 3

Comparison of 15 W-40 vs. 5 W-30

FIG. 3 shows the MP8 test results for a 15 W-40 engine oil and a 5 W-30 engine oil. Assuming field testing for the 15 W-40 is conducted on a Flat road and the 5 W-30 on a Hilly road, the average Fuel Rate for the 5 W-30 would be much higher (43.5 kg/hr. for the 5 W-30 versus 31.4 kg/hr for the 15 W-40). After the normalization to the same Power as the Flat road (149.3 kW), a fair comparison between the 5 W-30 and the 15 W-40 can be made.

Example 4

Engine Control Unit (ECU) Data Accuracy

On-board Engine Control Unit (ECU) monitors a broad range of vehicle operating parameters ranging from fuel rate to engine speed. The precision and accuracy of ECU fuel consumption data has discussed in publications including, for example, Fuel Consumption Tests for Evaluating the Accuracy and Precision of Truck Engine Electronic Control Modules to Capture Fuel Data, SAE 2009-1-1605, M.-D Surcel, J. Michaelsen, Society of Automotive Engineers, Warrendale, Pa. 2009, and In Use Evaluation of Fuel Economy and Emissions from Coal Haul Trucks Using Modified SAE J1321 Procedures and PEMS, SAE 2008-01-1302, S. F. Haggis, T. A. Hansen, K. D. Hicks, R. G. Richards, R. Marx, Society of Automotive Engineers, Warrendale, Pa. 2008. In one publication, it was reported that the idle fuel consumption data from ECU could vary by 10% from the actual data. In the study by Surcel and Michaelsen, it was concluded that ECM fuel data might be used for long term operations when expected fuel improvements are at least 5%. In many cases, the differences are biases in one direction. Thus, using the same vehicle for both the baseline and candidate tests will eliminate some of these biases It was reported by Haggis et al. that the speed from the ECU is also biased low, as compared to a diesel electric generation system. The effect of these biases can also be eliminated in the method of this disclosure if the same vehicle is used for both the baseline and candidate tests.

A test with the MP8 engine was conducted to evaluate the precision and accuracy of the ECU data. The results are shown in FIG. 4. For fuel rate measurements, the large difference in low flow rates is partially due to the fact that the resolution of ECU fuel rate in this engine is 1 liter/hr. Based on these observations, it is preferred to use the data with fuel rate higher than 25 liter/hr.

Since the fuel rates from the ECU could be up to 4% off from those fuel flow meter (even when fuel rate is higher than 25 liter/hr.), it is preferred to use the vehicles of the same make and model year in test. Furthermore, test precision can be further improved if the same vehicles are used for both the candidate and reference testing.

Example 5

Comparison by Averaging a Large Dataset

In real field conditions, there are many factors influencing fuel economy (for example vehicle payload and wind speed) that cannot be controlled in field trials. These create error in measurements of fuel economy differences attributable to the controlled variables (for example a 5 W-30 engine oil compared with a 15 W-40 engine oil). However, with a suitably large data set collected over a lengthy period of time, the fuel economy differences attributable to random factors (such as payload or wind speed) can be expected to approach zero, and the fuel economy measured in separate Test and Control groups will approach their expected values. Field trial methods rely on this concept. The vehicles' ECUs provide a reliable source of data over these long time frames to make this experimental approach a feasible one. An example of the results of a field trial conducted over several months is given below. In this field trial, traditional fuel logs and digital ECU data recorded by the datalogger were used. In addition, a supplementary method is described for estimating the energy produced by the vehicles using ECU data and a model of the observed power of the vehicles' motion.

Test Design

Figure 5:
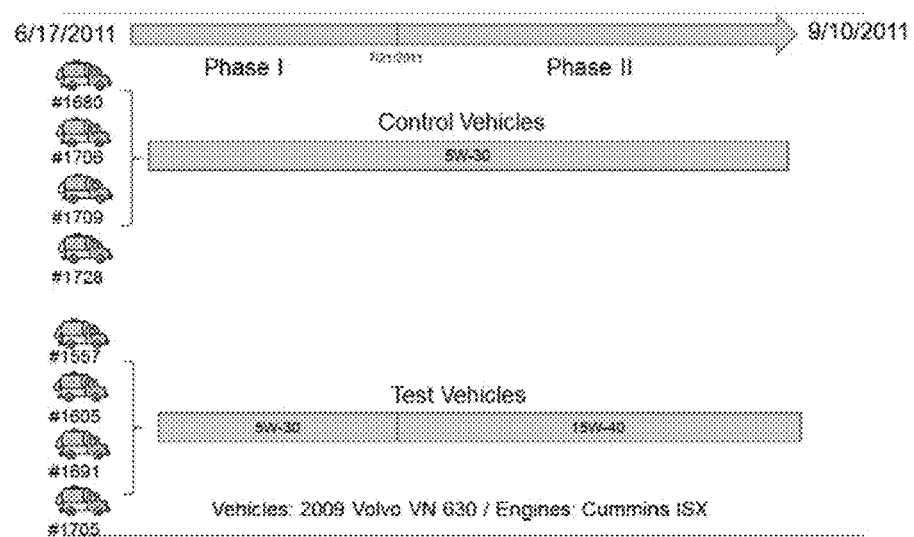
FIG. 5 shows the test design for the field trial that was divided into Phase I and Phase II and the vehicles that were divided into two groups (four Control Vehicles and four Test Vehicles) in accordance with Example 5.

The field trial was divided into Phase I and Phase II and the vehicles were divided into two groups (four Control Vehicles and four Test Vehicles). The vehicles are 2009 Volvo VN 630 equipped with an Cummins ISX engine. An SAE 5 W-30 engine oil was used for the Control Vehicles and for the Phase I of the Test Vehicles, while an SAE 15 W-40 engine oil was used for the Phase II of the test vehicles as shown in FIG. 5.

Traditional Fuel Log Data

The field trial data based on traditional fuel log are summarized in FIG. 6.

Datalogger Data

The fuel rate, engine rpm, and other parameters were recorded at a frequency of 1 Hz. One of the dataloggers was damaged and the data were not included in the analysis. The data obtained at engine speeds less than 1000 rpm were defined as Idle condition while those obtain at engine speeds equal or higher than 1000 were defined as Normal Driving condition. Due to the relatively low fuel rates under idle condition, it was expected that the data obtained under idle condition would have lower precision.

Normal Driving (Based on Datalogger)

Under normal driving conditions, the data in each phases were examined for comparison between the 5 W-30 and the 15 W-40 engine oils. In addition, the combined Phase 1 and Phase 2 results for 5 W-30 and 15 W-40 engine oils were compared. The results are shown in FIG. 7.

Idle Condition (Based on Datalogger)

Under idle conditions, the data in each phases were examined for comparison between the 5 W-30 and the 15W40 engine oils. In addition, the combined Phase 1 and Phase 2 results for 5 W-30 and 15 W-40 engine oils were compared. The results are shown in FIG. 8.

Overall Results (Based on Datalogger)

The data for both normal driving and idle conditions were further combined to allow the assessment of the overall benefits of 5 W-30 vs. 15 W-40. The results are shown in FIG. 9.

Example 6

Comparison of Candidate Versus Reference by Selecting Data at Similar Driving Conditions The fuel economy of the vehicle is directly related to the power output of the engine. Factors such as driving style and traffic conditions for example have a large influence on the fuel economy in miles per gallon. Unfortunately, unlike a stationary engine in a lab fitted with a dynamometer and torque meter, it is difficult to directly measure the power output of a real vehicle in the field. Regardless, an estimate of the power output can be made by applying a simplified to model of the forces exerted by the vehicle. This estimate will have error associated with it, but may be able to account for gross differences in fuel economy attributed to individual driving style and traffic conditions.

The model of this disclosure includes three contributions. First, a contribution from the vehicle's inertia due to its mass (estimated by operator) and acceleration (calculated from ECU data). Second, a contribution from the drag force overcome by the vehicle attributed to its drag coefficient (estimated by vehicle manufacturer) and speed (measured from ECU data). Third, a contribution from rolling friction due to a friction coefficient (estimated) and speed (measured from ECU data). While this is an incomplete accounting of the forces exerted on the vehicle, it can distinguish, for example, city driving conditions (characterized by frequent accelerations and decelerations) from highway driving conditions (characterized by infrequent accelerations) and account for the different effects of inertia and drag influencing fuel economy. In the test method of this disclosure for field trial fuel economy, the described model is applied to ECU data and the effect of the modeled power on the observed fuel economy is observed. This allows one to judge the role of driving style and traffic conditions on the measured results, and optionally attempt to correct for these differences in the final fuel economy results.

Example 7

Measurement of Engine Torque

Today, in most of the vehicles, the torque from the ECU is not a direct measurement from a sensor on the vehicle but rather a calculated value expressed as a percent of engine reference torque. Torque is relative to the torque curve for the engine as a function of air intake quantity, engine speed, boost, altitude, temperatures and other engine characteristics. The Actual & Demand Engine Torque Percent parameters are reported using SAE J1939 protocol in-vehicle network datalogger. This datalogger utilizes controller area network (CAN) bus to interface to vehicle operation data transmitted from the ECU. J1939 standard defines numerous parameters that could be on a vehicle and user selectable for acquisition. Several different parameters are recorded for proof of performance testing. Torque could also be derived by direct measurement utilizing a sensor mounted on the transmission shaft and by indirect measurements, such as from combustion pressure sensing elements in the engine combustion chamber and from speed measurement of rotating engine components (e.g., crankshaft). In this disclosure, the actual measured torque value, if available, is used in the calculation of the engine power and BSFC, like in the dyno examples. External torque sensors, such as Surface Accoustic Wave (SAW) sensors from Honeywell, could also be installed for toque measurements for vehicles not equipped with torque sensors.

Example 8

Use of Wireless Internet and 3G/4G Connections

Figure 10:
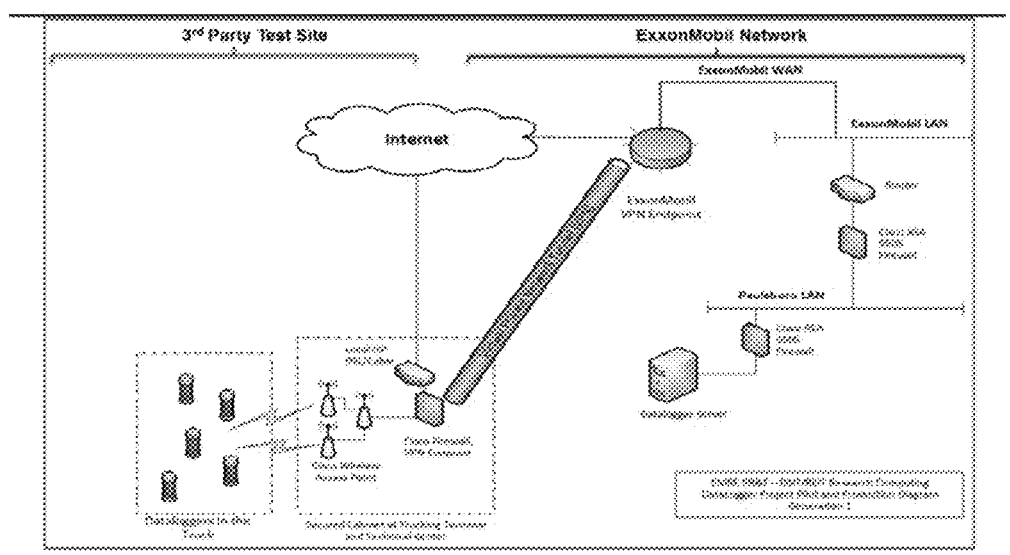
FIG. 10 shows data transmission from an in-vehicle datalogger back into a database that is automated using a wireless Wi-Fi option in accordance with Example 8.

Data transmission from the in-vehicle datalogger back into a database can be automated using a wireless Wi-Fi option. Wi-Fi infrastructure can use 802.11n Wi-Fi Access Points at 2.4 GHz that provides connection between WiFi enabled datalogger to a wireless area network via backchannel virtual private network (Wi-Fi Datalloger architecture as shown in FIG. 10). All the messages transmitted across the network can be encrypted and use of firewall provides a secure connection.

Example 9

Figure 11:
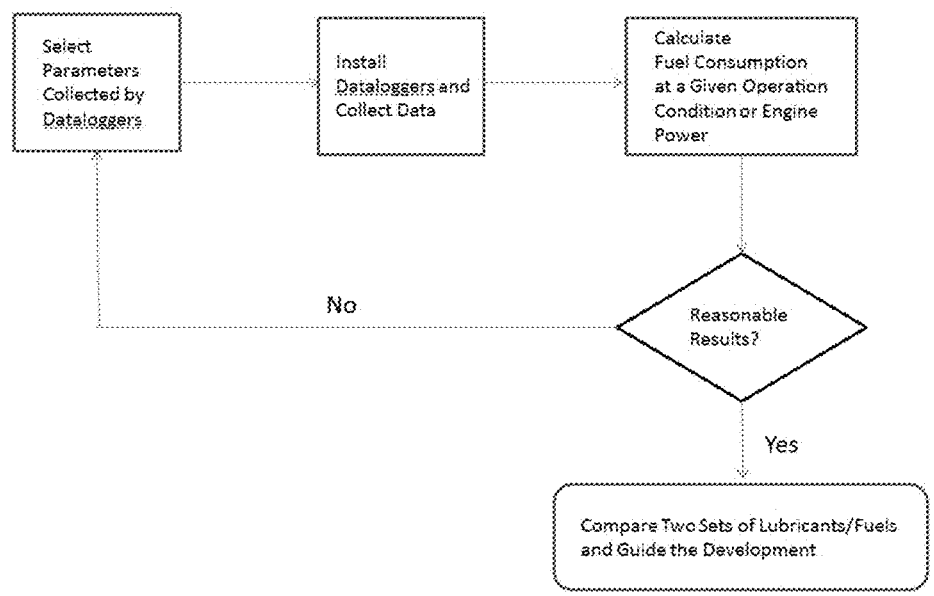
FIG. 11 is a flow chart showing a comparison of lubricants/fuels and a guide to development determined by fuel efficiency.

FIG. 11 is a flow chart showing a comparison of lubricants/fuels and a guide to development determined by fuel efficiency. Parameters are selected to be collected by the dataloggers. The parameters include, for example, vehicle speed, fuel level, engine speed, load, mass air flow, manifold air pressure, odometer reading, and the like. One or more dataloggers are installed in one or more vehicles to collect data. Fuel consumption is calculated at a given operation condition or engine power. The results are then analyzed. The comparison includes, for example, lubricants of different viscometric properties; mineral versus synthetic lubricants including engine oils, gear oils, and hydraulic fluids; combinations of lubricants and hardware designs; lubricants with and without friction modifiers; lubricants with different frictional properties; fresh lubricants and aged lubricants; and combinations of lubricants and fuels.

Example 10

Figure 12:
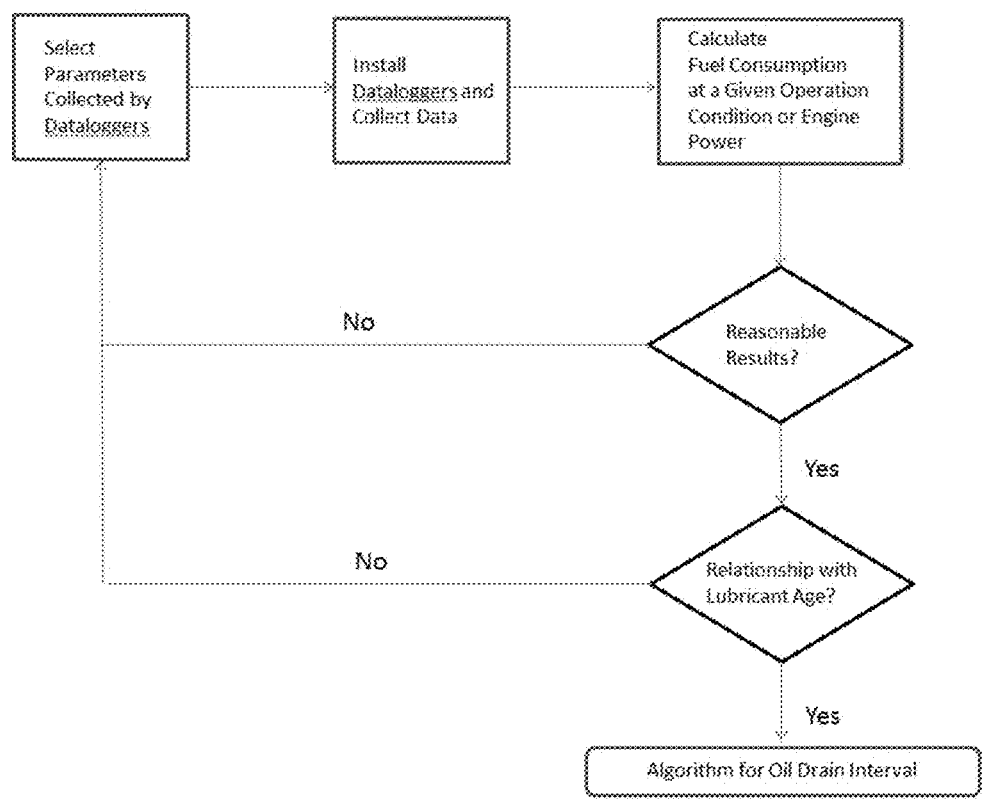
FIG. 12 is a flow chart showing oil drain interval determined by the relationship between fuel efficiency and oil age.

FIG. 12 is a flow chart showing a determination of oil drain interval. Parameters are selected to be collected by the dataloggers. The parameters include, for example, vehicle speed, fuel level, engine speed, load, mass air flow, manifold air pressure, odometer reading, and the like. One or more dataloggers are installed in one or more vehicles to collect data. Fuel consumption is calculated at a given operation condition or engine power. The results are then analyzed. The relationship between fuel efficiency and oil age is determined. An algorithm is then used for determining oil drain interval.

PCT and EP Clauses:

1. A method for improving fuel efficiency testing precision in on-road vehicles, the method comprising:
   installing one or more dataloggers in one or more vehicles, each datalogger configured to receive fuel consumption data broadcast by an on-road vehicle's engine control unit (ECU);
   transmitting the fuel consumption data from the one or more dataloggers in the one or more on-road vehicles to a processor; and
   analyzing, using the processor, the fuel consumption data from the one or more dataloggers in the one or more on-road vehicles to determine fuel efficiency of the one or more on-road vehicles.

2. A method for improving fuel efficiency testing precision in on-road vehicles, the method comprising:
   installing one or more dataloggers in one or more vehicles, each datalogger configured to receive fuel consumption data broadcast by an on-road vehicle's engine control unit (ECU);
   installing one or more torque sensors in the one or more vehicles, each torque sensor configured to measure torque value in the one or more on-road vehicles;
   transmitting the fuel consumption data from the one or more dataloggers and the one or more torque sensors in the one or more on-road vehicles to a processor; and
   analyzing, using the processor, the fuel consumption data from the one or more dataloggers and the one or more torque sensors in the one or more on-road vehicles to determine fuel efficiency of the one or more on-road vehicles.

3. A method for determining oil drain interval in on-road vehicles, the method comprising:
   installing one or more dataloggers in one or more vehicles, each datalogger configured to receive fuel consumption data broadcast by an on-road vehicle's engine control unit (ECU);
   optionally installing one or more torque sensors in the one or more vehicles, each torque sensor configured to measure torque value in the one or more on-road vehicles;
   transmitting the fuel consumption data from the one or more dataloggers and optionally the one or more torque sensors in the one or more on-road vehicles to a processor; and
   analyzing, using the processor, the fuel consumption data from the one or more dataloggers and optionally the one or more torque sensors in the one or more on-road vehicles to determine fuel efficiency of the one or more on-road vehicles;
   wherein the oil drain interval is determined by the relationship between fuel efficiency and oil age.

4. The method of clauses 1-3 wherein the fuel efficiency testing compares one or more of the following: lubricants of different viscometric properties; mineral versus synthetic lubricants including engine oils, gear oils, and hydraulic fluids; combinations of lubricants and hardware designs; lubricants with and without friction modifiers; lubricants with different frictional properties; fresh lubricants and aged lubricants; and combinations of lubricants and fuels.

5. The method of clause 4 wherein the different lubricants are lubricants with different viscosity grades, low and high shear viscosities at different temperatures, or with different additives or different concentrations of additives.

6. The method of clauses 1-3 wherein the fuel consumption data comprises fuel rate data from the ECU which is transmitted through the one or more dataloggers, engine speed and other operating parameters from the ECU that are transmitted through the one or more dataloggers, torque sensor data which is transmitted through the one or more dataloggers, and traditional fuel log data.

7. The method of clauses 1-3 wherein the fuel consumption data describes at least one of a plurality of on-road vehicle parameters selected from vehicle speed, fuel level, engine speed, load, mass air flow, manifold air pressure, and odometer reading.

8. The method of clauses 1-3 wherein the analyzing comprises determining an amount of fuel consumed by the one or more on-road vehicles during an interval, determining a distance traveled by the one or more on-road vehicles during the interval, and calculating the one or more on-road vehicle's fuel efficiency from the amount of fuel consumed and the distance traveled during the interval.

9. The method of clauses 1-3 further comprising:
   collecting, in one or more databases, the transmitted fuel consumption data from the one or more dataloggers and the one or more torque sensors in the one or more on-road vehicles.

10. The method of clause 9 wherein the one or more databases store, review and filter data and information for comparing lubricants of different viscometric properties; mineral versus synthetic lubricants; combinations of lubricants and hardware designs; lubricants with and without friction modifiers; lubricants with different frictional properties; fresh lubricants and aged lubricants; and combinations of lubricants and fuels.

11. The method of clause 9 wherein the one or more databases allow for selective mining and statistical treatment of: operating regimes across vehicles; near continuous operational data on specific vehicles or classes of vehicles; identification of vehicles or time periods where measured operation is outside of typical domains; selective filtering of data based on operational data parameters; and associating vehicle engines with keys linked to external oil analysis.

12. The method of clauses 1-3 wherein the processor is configured to algorithmically calculate the fuel efficiency of the one or more on-road vehicles based on fuel consumption data transmitted from the one or more dataloggers and the one or more torque sensors in the one or more on-road vehicles.

13. The method of clauses 1-3 further comprising:

correlating fuel rate and power produced sufficient to form a basis for normalization of different fuel rates to the same average power.

14. The method of clause 13 wherein normalization is calculated by the formula $$FR2=FR1+k(P2-P1)$$

wherein FR2 is the normalized fuel rate, FR1 is the original fuel rate, k is the slope of a fuel rate versus power plot, P2 is the average power to be normalized to, and P1 is the original power.

15. The method of clause 3 wherein the oil drain interval is the time interval from time the oil was change until the time when the fuel efficiency is reduced significantly.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A method for improving fuel efficiency testing precision in on-road vehicles, the method comprising:
installing one or more dataloggers in one or more vehicles, each datalogger configured to receive fuel consumption data broadcast by an on-road vehicle's engine control unit (ECU);
transmitting the fuel consumption data from the one or more dataloggers in the one or more on-road vehicles to a processor; and
analyzing, using the processor, the fuel consumption data from the one or more dataloggers in the one or more on-road vehicles to determine fuel efficiency of the one or more on-road vehicles; and
wherein the fuel consumption data from the one or more data loggers compares one or more of the following: lubricants of different viscometric properties; mineral versus synthetic lubricants including engine oils, gear oils, and hydraulic fluids; combinations of lubricants and hardware designs; lubricants with and without friction modifiers; lubricants with different frictional properties; fresh lubricants and aged lubricants; and combinations of lubricants and fuels.

2. The method of claim 1 further comprising:
installing one or more torque sensors in the one or more vehicles, each torque sensor configured to measure torque value in the one or more on-road vehicles.

3. The method of claim 1 wherein the one or more dataloggers are telematic devices.

4. The method of claim 1 wherein the different lubricants are lubricants with different viscosity grades, low and high shear viscosities at different temperatures, or with different additives or different concentrations of additives.

5. The method of claim 1 wherein the fuel consumption data comprises fuel rate data from the ECU which is transmitted through the one or more dataloggers, engine speed and other operating parameters from the ECU that are transmitted through the one or more dataloggers, torque sensor data which is transmitted through the one or more dataloggers, and traditional fuel log data.

6. The method of claim 1 wherein the fuel consumption data describes at least one of a plurality of on-road vehicle parameters selected from vehicle speed, fuel level, engine speed, load, mass air flow, manifold air pressure, and odometer reading.

7. The method of claim 1 wherein the analyzing comprises determining an amount of fuel consumed by the one or more on-road vehicles during an interval, determining a distance traveled by the one or more on-road vehicles during the interval, and calculating the one or more on-road vehicle's fuel efficiency from the amount of fuel consumed and the distance traveled during the interval.

8. The method of claim 1 wherein the processor is configured to algorithmically calculate the fuel efficiency of the one or more on-road vehicles based on fuel consumption data transmitted from the one or more dataloggers in the one or more on-road vehicles.

9. The method of claim 1 further comprising:
collecting, in one or more databases, the transmitted fuel consumption data from the one or more dataloggers in the one or more on-road vehicles.

10. The method of claim 9 wherein the one or more databases store, review and filter data and information for comparing lubricants of different viscometric properties; mineral versus synthetic lubricants; combinations of lubricants and hardware designs; lubricants with and without friction modifiers; lubricants with different frictional properties; fresh lubricants and aged lubricants; and combinations of lubricants and fuels.

11. The method of claim 9 wherein the one or more databases allow for selective mining and statistical treatment of: operating regimes across vehicles; near continuous operational data on specific vehicles or classes of vehicles; identification of vehicles or time periods where measured operation is outside of typical domains; selective filtering of data based on operational data parameters; and associating vehicle engines with keys linked to external oil analysis.

12. The method of claim 1 further comprising:
correlating fuel rate and power produced sufficient to form a basis for normalization of different fuel rates to the same average power.

13. The method of claim 12 wherein normalization is calculated by the formula $$FR2=FR1+k(P2-P1)$$

wherein FR2 is the normalized fuel rate, FR1 is the original fuel rate, k is the slope of a fuel rate versus power plot, P2 is the average power to be normalized to, and P1 is the original power.

14. The method of claim 1 wherein the analyzing comprises determining an amount of fuel consumed under normal driving conditions and idle conditions, and calculating the one or more on-road vehicle's fuel efficiency from the amount of fuel consumed under the normal driving conditions and the idle conditions.

15. The method of claim 14 wherein the analyzing further comprises determining one or more of driving speed, engine revolutions per minute (rpm), and engine operating conditions under normal driving conditions and idle conditions, and calculating the one or more on-road vehicle's fuel efficiency from one or more of driving speed, engine revolutions per minute (rpm), and engine operating conditions under normal driving conditions and idle conditions.

16. A method for improving fuel efficiency testing precision in on-road vehicles, the method comprising:
installing one or more dataloggers in one or more vehicles, each datalogger configured to receive fuel consumption data broadcast by an on-road vehicle's engine control unit (ECU);
installing one or more torque sensors in the one or more vehicles, each torque sensor configured to measure torque values in the one or more on-road vehicles;
transmitting the fuel consumption data from the one or more dataloggers and the torque values from the one or more torque sensors in the one or more on-road vehicles to a processor; and
analyzing, using the processor, the fuel consumption data from the one or more dataloggers and the torque values from the one or more torque sensors in the one or more on-road vehicles to determine fuel efficiency of the one or more on-road vehicles; and
wherein the fuel consumption data from the one or more data loggers compares one or more of the following: lubricants of different viscometric properties; mineral versus synthetic lubricants including engine oils, gear oils, and hydraulic fluids; combinations of lubricants and hardware designs; lubricants with and without friction modifiers; lubricants with different frictional properties; fresh lubricants and aged lubricants; and combinations of lubricants and fuels.

17. The method of claim 16 wherein the fuel consumption data comprises fuel rate data from the ECU which is transmitted through the one or more dataloggers, engine speed and other operating parameters from the ECU that are transmitted through the one or more dataloggers, torque sensor data which is transmitted through the one or more dataloggers, and traditional fuel log data.

18. The method of claim 16 further comprising:
collecting, in one or more databases, the transmitted fuel consumption data from the one or more dataloggers and the one or more torque sensors in the one or more on-road vehicles.

19. The method of claim 16 wherein the processor is configured to algorithmically calculate the fuel efficiency of the one or more on-road vehicles based on fuel consumption data transmitted from the one or more dataloggers and the one or more torque sensors in the one or more on-road vehicles.

20. A method for determining oil drain interval in on-road vehicles, the method comprising:
installing one or more dataloggers in one or more vehicles, each datalogger configured to receive fuel consumption data broadcast by an on-road vehicle's engine control unit (ECU);
installing one or more torque sensors in the one or more vehicles, each torque sensor configured to measure torque values in the one or more on-road vehicles;
transmitting the fuel consumption data from the one or more dataloggers and the torque values from the one or more torque sensors in the one or more on-road vehicles to a processor; and
analyzing, using the processor, the fuel consumption data from the one or more dataloggers and the torque values from the one or more torque sensors in the one or more on-road vehicles to determine fuel efficiency of the one or more on-road vehicles;
determining the oil age by measuring the time interval from the time the oil was changed until the time when the fuel efficiency is reduced significantly;
wherein the oil drain interval is determined by the relationship between fuel efficiency and oil age.

21. The method of claim 20 wherein the fuel consumption data describes at least one of a plurality of on-road vehicle parameters selected from vehicle speed, fuel level, engine speed, load, mass air flow, manifold air pressure, and odometer reading.

22. The method of claim 20 wherein the analyzing comprises determining an amount of fuel consumed by the one or more on-road vehicles during an interval, determining a distance traveled by the one or more on-road vehicles during the interval, and calculating the one or more on-road vehicle's fuel efficiency from the amount of fuel consumed and the distance traveled during the interval.

23. The method of claim 20 further comprising:
correlating fuel rate and power produced sufficient to form a basis for normalization of different fuel rates to the same average power.

24. The method of claim 23 wherein normalization is calculated by the formula $$FR2=FR1+k(P2-P1)$$

wherein FR2 is the normalized fuel rate, FR1 is the original fuel rate, k is the slope of a fuel rate versus power plot, P2 is the average power to be normalized to, and P1 is the original power.

25. The method of claim 20 wherein the analyzing comprises determining an amount of fuel consumed under normal driving conditions and idle conditions, and calculating the one or more on-road vehicle's fuel efficiency from the amount of fuel consumed under the normal driving conditions and the idle conditions.

26. The method of claim 25 wherein the analyzing further comprises determining one or more of driving speed, engine revolutions per minute (rpm), and engine operating conditions under normal driving conditions and idle conditions, and calculating the one or more on-road vehicle's fuel efficiency from one or more of driving speed, engine revolutions per minute (rpm), and engine operating conditions under normal driving conditions and idle conditions.

* * * * *